Sept. 9, 1969          R. C. FISHER          3,465,393
SEAT BELT BUCKLE
Filed April 10, 1967          3 Sheets-Sheet 2
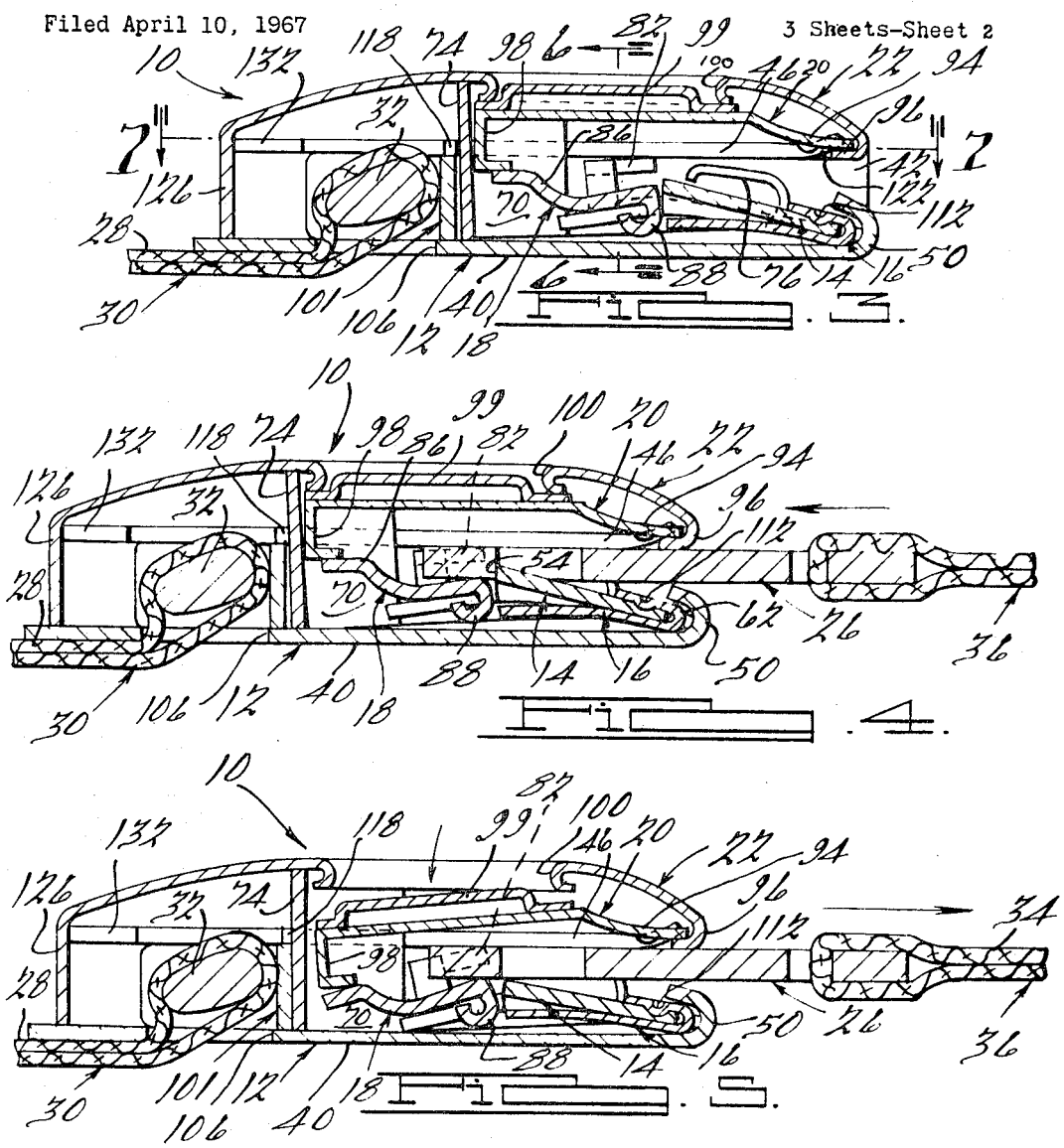
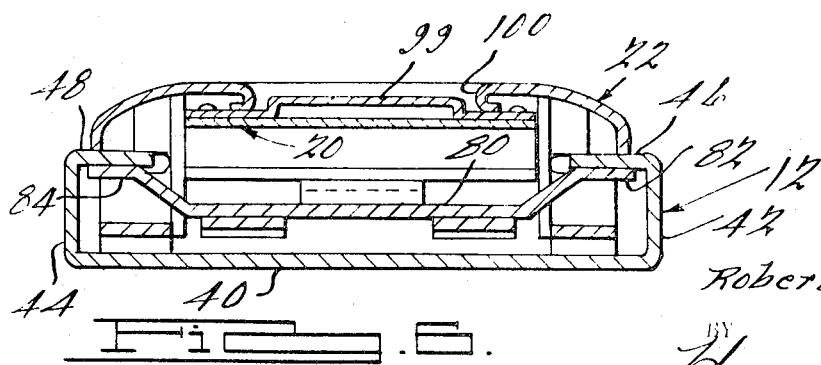
INVENTOR.
Robert C. Fisher
BY Harness, Dickey & Pierce
ATTORNEYS Sept. 9, 1969        R. C. FISHER        3,465,393
SEAT BELT BUCKLE
Filed April 10, 1967        3 Sheets-Sheet 3
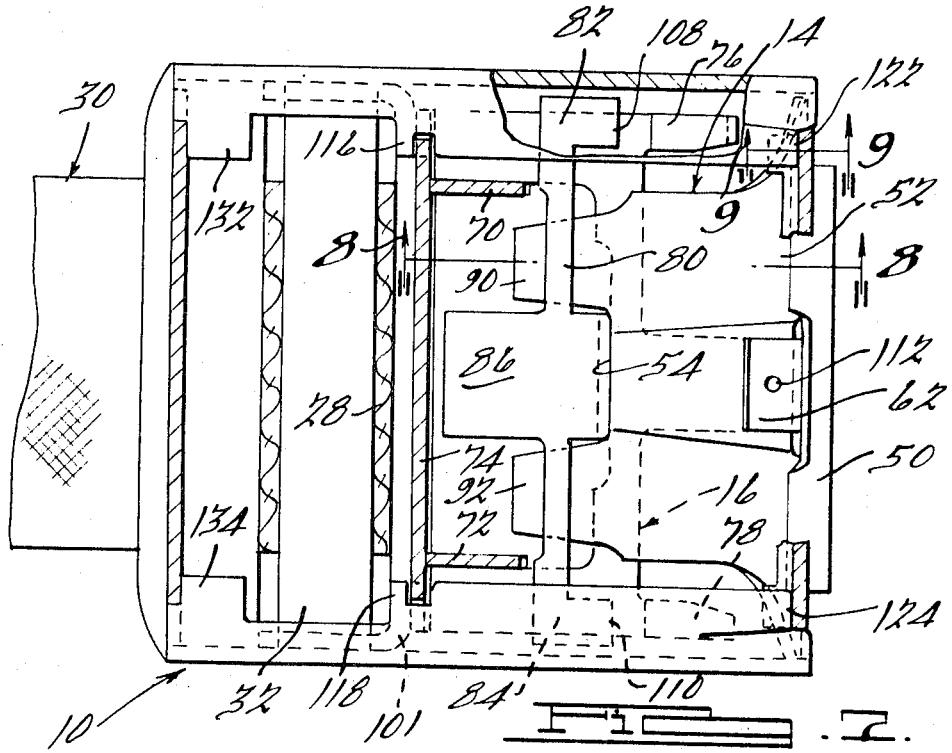
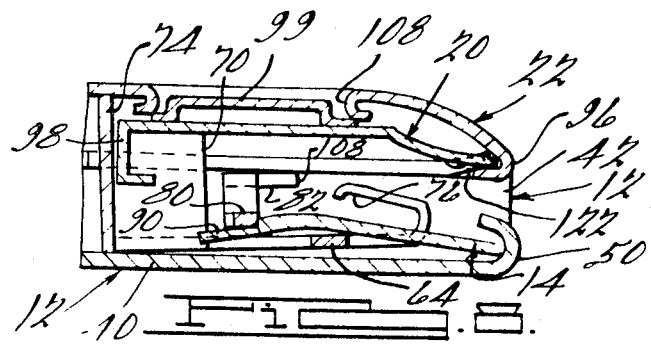
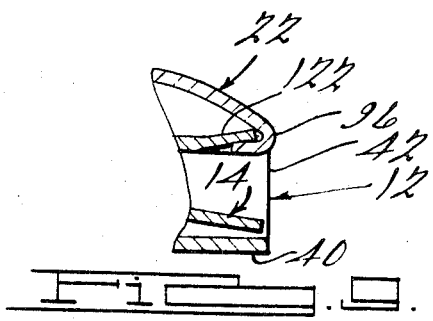
INVENTOR.
Robert C. Fisher 3,465,393
SEAT BELT BUCKLE
Robert C. Fisher, 580 E. Long Lake Road,
Bloomfield Hills, Mich. 48013
Filed Apr. 10, 1967, Ser. No. 629,690
Int. Cl. A44b 19/00
U.S. Cl. 24—230                                                11 Claims

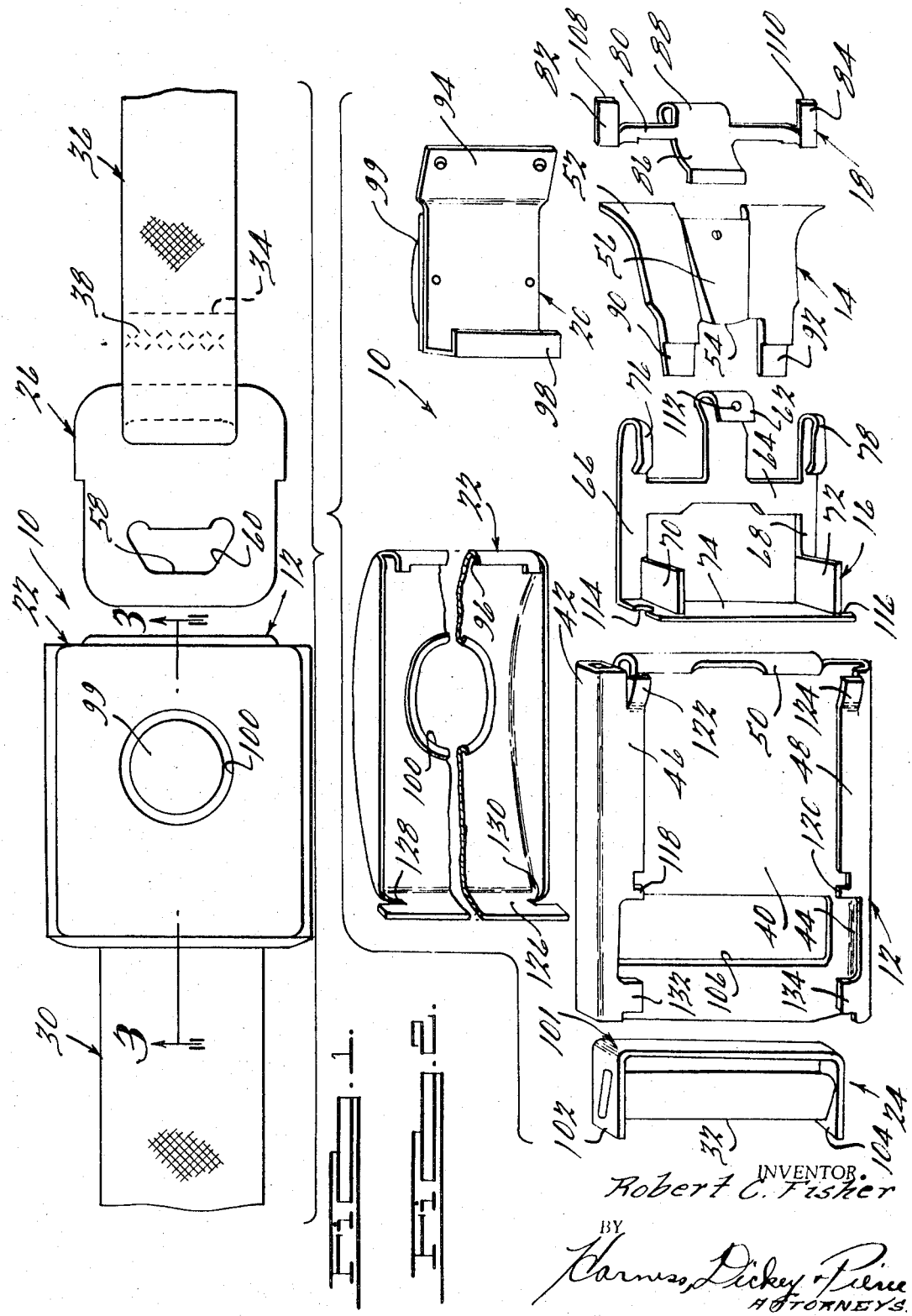

ABSTRACT OF THE DISCLOSURE

A seat belt buckle assembly comprising a base member having a central web portion and a pair of laterally spaced side walls with reentrantly folded edge portions; a latch plate overlying the base member and having one end thereof pivotably secured thereto, the latch plate having means thereon defining a latching face adapted to engage a complementary-shaped latching surface on an associated belt tongue member for limiting relative movement between the tongue and the base member; spring means for resiliently biasing the latch plate toward the tongue member; a latch lever engageable with the latch plate; a cover member substantially surrounding the upper end of the assembly and defining an access opening overlying the latch face, and a manual operator member disposed between the cover member and the belt tongue and accessible through the opening, movement of the operator member relative to the base member effecting movement of the latch member and the latch plate for disengaging the latch face from the tongue.

BACKGROUND OF THE INVENTION

The widespread acceptance and use of automobile seat belts has emphasized the need for inexpensive seat belt buckle assemblies capable of meeting rigid safety requirements. Such requirements demand that a seat belt buckle be positively engageable with an associated belt tongue, and that a buckle be free of external appurtenances which may tend to snag clothing, seats or the like. It is also desirable in the construction of such buckle assemblies to provide an arrangement wherein the effort required to disengage or unlatch the tongue member from the buckle assembly is minimized to the extreme, thereby facilitating rapid and effortless removal of the safety belt.

The present invention satisfies the above requirements through the provision of a novel buckle assembly, the components parts of which have a geometry that provides a mechanical advantage between the manually engageable operator member and the latching member which releasably secures the belt tongue within the assembly, whereby the latching member will be disengaged from the tongue with a minimum amount of movement of the operator member, thus facilitating effortless removal of the belt.

A particular feature of the buckle assembly of the present invention resides in the fact that internal components of the assembly are adapted to coact in biasing the latching member in one direction relative to the associated belt tongue, while simultaneously moving or "stripping" the tongue member in the opposite direction, with the result that the tongue is rapidly, as well as effortlessly released upon manual actuation of the operator member.

SUMMARY OF THE INVENTION

This invention relates generally to buckle assemblies and, more particularly, to a new and improved buckle assembly adapted to find particular useful application with automotive seat belts.

It is accordingly a general object of the present invention to provide a new and improved buckle assembly adapted to be operatively associated with an automotive seat belt.

It is a more particular object of the present invention to provide a new and improved seat belt buckle assembly which is pleasant in appearance, as well as being smooth and devoid of any external appurtenances which might tend to snag clothing, seats or the like.

It is another object of the present invention to provide a new and improved buckle assembly of the above character which may be assembled with a minimum number of components parts and without the use of any pins, screws, keys or similar fastening means.

It is a further object of the present invention to provide a new and improved buckle assembly of the above character which minimizes to the extreme, the time and effort required to release the associated tongue member therefrom, whereby to facilitate convenient removal of the associated seat belt.

Other objects and advantages of the present invention will become apparent from the following detailed description, taken in conjunction with the accompanying drawings.

BRIEF DESCRIPTION OF THE DRAWINGS

FIGURE 1 is a top elevational view of the buckle assembly of the present invention showing the associated belt tongue member removed therefrom;

FIGURE 2 is an exploded perspective of the seat belt buckle assembly of FIGURE 1;

FIGURE 3 is a longitudinal cross sectional view taken substantially along the line 3—3 of FIGURE 1;

FIGURE 4 is a cross sectional view similar to FIGURE 3 with the tongue member disposed in a latched position;

FIGURE 5 is a view similar to FIGURE 4 with the internal manual operator member and latch member disposed in released positions;

FIGURE 6 is a transverse cross sectional view taken substantially along the line 6—6 of FIGURE 3;

FIGURE 7 is a longitudinal cross sectional view taken substantially along the line 7—7 of FIGURE 3;

FIGURE 8 is a fragmentary cross sectional view taken substantially along the line 8—8 of FIGURE 7, and FIGURE 9 is a fragmentary cross sectional view of a portion of the buckle assembly illustrated in FIGURE 7, as taken substantially along the line 9—9 thereof.

DESCRIPTION OF THE PREFERRED EMBODIMENT

Referring now to the drawings, a safety belt buckle assembly 10, in accordance with a preferred embodiment of the present invention, is shown as comprising a base member 12, a latch plate 14, a latch spring 16, a latch lever 18, an internal manual operator member 20, a cover member 22 and a belt attaching bar assembly 24. The foregoing components are assembled in interlocking relationship and are adapted to be self-restrained in the assembled condition, as will hereinafter be described.

As best seen in FIGURES 1, 3 and 4, a generally flat belt tongue member 26 is adapted to be releasably received and retained within one end of the assembly 10, while an end portion 28 of a first belt section 30 is adjustably looped around a belt bar 32 of the bar assembly 24 in the opposite end of the assembly 10. An end portion 34 of a second belt section 36 is secured to the tongue member 26, as by stitching designated by the numeral 38.

Referring to FIGURE 2, it will be seen that the base member 12 is of a generally channel-like configuration in transverse cross section and comprises a central web portion 40 having laterally spaced parallel walls defining upstanding reentrantly folded flange portions 42 and 44. The flange portions 42, 44 define laterally inwardly projecting edge portions 46 and 48, respectively, that extend generally parallel to the web portion 40. The portion 40 of the base member 12 is formed with a reentrantly folded latch retainer section 50 at one end thereof which functions to pivotally accept an end portion 52 of the latch plate 14, whereby the plate 14 is supported for pivotal movement relative to the base member 12, yet is retained against movement longitudinally of the member 12 by the retainer section 50 thereof.

The latch plate 14 is formed with a latch face 54 on an offset medial portion 56 thereof, the face 54 being engageable with a complementary-shaped latch surface 58 defined by the periphery of a central opening 60 formed in the tongue member 26, whereby to effect locking the tongue member 26 within the buckle assembly 10. The latch plate 14 is normally resiliently biased toward the latched position (see FIGURE 4) by means of the spring 16, one end portion 62 of which is reentrantly folded about the offset portion 56 of the latch plate 14, as seen in FIGURES 3–5. The end portion 62 of the spring 16 is integrally formed on and extends longitudinally from a laterally extending spring portion 64 which in turn is connected at its opposite ends to a pair of longitudinally extending side portions 66 and 68. As seen in FIGURE 2, a pair of upright portions 70 and 72, folded perpendicularly to the side portions 66 and 68, are secured to a perpendicularly folded upright portion 74. The latch spring 16 comprises a pair of reentrantly folded portions or "fingers" 76 and 78 projecting from the laterally extending portion 64 in the same direction as the end portion 62. When the tongue member 26 is secured or latched within the buckle assembly 10, the fingers 76 and 78 of the latch spring 16 exert an upwardly directed resilient force against the lower side of the tongue member 26 to minimize any relative movement or "rattling" of the member 26 within the assembly 10.

The latch lever 18 comprises a transversely extending portion 80 having a pair of offset ears 82 and 84 formed at opposite ends thereof. Centrally located on the transverse portion 80 is an upstanding portion 86 and an inwardly rolled, semi-circular portion 88. The transverse portion 80 of the latch lever 18 is adapted to engage the latch plate 14 within a pair of recessed portions 90 and 92 formed at one end thereof, and the ears 82 and 84 of the latch lever 18 are adapted to be biased into abutting engagement with the edges 46 and 48 of the base member 12 as the latch plate 14 is urged toward the latch position by the spring 16. The rolled portion 88 of the latch lever 18 is adapted to function as a latch plate stripper means by engaging the tongue member 26 when the latch plate 14 is biased to the release position by the manual operator member 20, as will hereinafter be described.

As best illustrated in FIGURES 1 and 3–5, the manual operator member 20 comprises an arcuate-shaped, downwardly inclined end portion 94 that is pivotally received and supported within a reentrantly folded end portion 96 of the cover member 22. The opposite end of the operator member 20 is reentrantly folded, as seen at 98, so as to be engageable with the upstanding portion 86 of the latch lever 18. A decorative trim plate or "button" 99 is preferably mounted on the upper side of the member 20 at a position registering with a central aperture 100 formed in the cover member 22 to provide manual access to the member 20.

The bar assembly 24 comprises a generally C-shaped bar support bracket 101 having elongated slots or apertures in the opposite ends 102 and 104 thereof for the acceptance of complementary-shaped ears formed on opposite ends of the belt bar 32. The ends 102 and 104 of the bracket 101 are disposed within and guided for longitudinal sliding movement relative to the base member 12 by means of the edge portions 46 and 48. The belt section 30 extends through a generally rectangularly-shaped opening 106 formed in the base 12 and is looped around the bar 32, thereby securing the belt section 30 to the assembly 10.

As best seen by comparing FIGURES 3, 4 and 5, when pressure is applied to the manual operator member 20, as by the operator's finger, the member 20 rotates or pivots downwardly about a transversely extending axis defined by the reentrantly folded end portion 96 of the cover member 22. Downward movement of the end portion 98 of the operator member 20 functions to bias the upstanding portion 86 of the latch lever 18 downwardly, whereby the entire latch lever 18 will be pivoted or rotated in a generally counterclockwise direction in FIGURES 4 and 5. As the latch lever 18 is thus rotated, the latch plate 14 is biased or pivoted downwardly about the fulcrum provided by the reentrantly folded portion 50 of the base member 12, thereby effecting disengagement of the latch face 54 from the complementary latch surface 58 on the tongue member 26 so that the member 26 can be removed from the buckle 10. Disengagement of the latch plate 14 from the tongue member 26 is assisted by the rolled portion 88 of the latch lever 18 which exerts an upwardly directed force against the lower side of the tongue member 26 to force or "strip" it upwardly as the latch lever 18 is rotated by the manual operator 20.

It will be seen that the geometry of the seat belt buckle assembly 10 of the present invention is such that the direction of movement of the latch face 54 on the latch plate 14 is generally parallel to the plane thereof and parallel to the direction of movement of the operator's finger as he actuates the member 20. Furthermore, if the offset ears 82 and 84 of the latch lever 18 are regarded as effectively constituting one lever arm, if the upstanding portion 86 of the latch lever 18 is regarded as effectively constituting a second lever arm, if tips 108 and 110 of the latch lever ears 82 and 84 are regarded as effectively constituting a lever fulcrum, and if the latch plate 14 is regarded as effectively constituting a load to which a force is to be applied, then it can be seen that the upstanding portion 86 of the latch lever 18 is longer than the ears 82 and 84 and thereby possesses a mechanical advantage over said ears as one lever arm over the other, thereby considerably reducing the amount of energy required to actuate the several components of the assembly 10.

The buckle assembly 10 of the present invention is assembled by initially mounting the end portion 62 of the latch spring 16 within the offset portion 56 of the latch plate 14. The spring 16 may be provided with a suitable indentation or detent 112 on the end portion 62 thereof adapted to be received within a complementary-shaped recess in the medial portion 56, whereby to preclude any relative lateral movement between the members 14 and 16. Thereafter, the latch lever 18 is mounted on the latch plate 14 by placing the transverse portion 80 within the recess 90 and 92 of the latch plate 14 and then aligning the rolled portion 88 of the latch lever 18 with the latch face 54 on the plate 14. the foregoing assembly is then inserted under the edge portions 46 and 48 of the base member 12 by longitudinally sliding the assemblage along the web portion 40 of the member 12 from left to the right in FIGURES 3 and 7. It is to be noted that a pair of notches 114 and 116 (see FIGURE 2) are formed in the laterally outer ends of the spring portion 74 to permit passage of the member 16 past a pair of projections 118 and 120 on the base 12. The portion 62 of the spring 16 has to be moved away from the web portion 40 of the base 12 against its normal bias to allow the projections 118 and 120 to pass through the notches 114 and 116, whereupon the spring 16 will automatically "snap" to the position shown in FIGURE 3. Once the spring 16 is in position, the projections 118 and 120 preclude movement thereof to the left in FIGURES 3 to 7.

The end portion 28 of the belt section 30 is next inserted through the aperture 106 in the base member 12 and is looped around the belt bar 32 of the bar assembly 24, which assembly is slidably disposed between the edge portions 46 and 48 of the base member 12. Lengthening of the belt section 30 is effected by tilting the buckle assembly 10 relative to the belt section 30, whereby the belt section 30 can be lengthened with one hand by merely pulling on the buckle 10. Shortening of the belt 30 is effected by merely pulling on the top or free end portion 28 thereof.

The operator member 20 is mounted within the cover member 22 by engaging the end portion 94 of the former within the reentrantly folded end portion 96 of the member 22. This assembly is then secured to the base member 12 by inserting a pair of downwardly inclined fingers 122 and 124 formed on the lower side of the member 12 into the reentrantly folded portion 96 of the cover member 22, and thereafter snapping a downwardly extending opposite end portion 126 of the member 22 over the opposite end of the base member 12, whereby notches 128 and 130 formed in the member 22 will be engaged by a pair of projections 132 and 134 formed on the lower side of the base member 12 to retain the member 22 in the assembled position illustrated in FIGURES 3–6. It will be noted that the inclined fingers 122 and 124 of the base member 12 prevent the reentrantly folded end portion 96 of the cover member 22 from extending beyond the plane of the inner surfaces of the edge portions 46 and 48. This feature allows the tongue member 26 to bear directly upon the inner sides of the edge portions 46 and 48 when the member 26 is disposed in the latched position. It will also be noted that the reentrantly folded portions 50 and 96 of the base member 12 and cover member 22, respectively, extend in close parallel laterally aligned relation so as to define a slot for the acceptance of the tongue member 26.

From the foregoing description, it will be apparent that through the provision of a novel geometry of component orientation, the assembly 10 makes convenient use of mechanical advantage principles, with the result that the assembly 10 may be rapidly and effortlessly actuated. Furthermore, because the assembly 10 is almost entirely enclosed and free of external appurtenances, both the interior and exterior of the assembly 10 will remain and thus effective in operation and pleasant in appearance. Also, by virtue of the interlocking relationship of the assembled components of the buckle 10, the use of pins, screws, keys or the like is entirely eliminated, thereby enhancing the economies of mass production.

While it will be apparent that the embodiment illustrated herein is well calculated to fulfill the objects above stated, it will be appreciated that the buckle assembly 10 of the present invention is susceptible to modification, variation and change without departing from the scope of the invention.

I claim:

1. In a safety belt buckle assembly,
   a base member having a central web portion and a pair of laterally spaced side walls with reentrantly folded edge portions,
   a latch plate overlying said base member and having one end thereof movably engageable with said base member,
   said latch plate having means thereon defining a latch face,
   a belt tongue having means defining a latch surface engageable with said latch face on said plate for limiting relative movement between said tongue and said base member,
   resilient means normally biasing said latch plate toward said tongue,
   latch lever means having means thereon engageable with said latch plate,
   cover means overlying said base member and defining an access opening, and
   manual operator means disposed between said cover means and said belt tongue and accessible through said opening, movement of said operator means relative to said base member effecting movement of said latch lever means and said latch plate for disengaging said latch face of said plate from said latch surface on said tongue,
   said latch lever means extending transversely of said base member and being pivotable about an axis extending generally normal to said side walls, the laterally outer ends of said latch lever terminating in close proximity to said side walls of said base member and cooperating therewith in positioning said latch lever generally centrally of said base member,
   said latch lever means providing a mechanical linkage between said operator means and said latch plate and having a first portion engageable with said base member and a second portion engageable with said operator means, said first and second portions being dimensioned so as to provide a mechanical advantage to minimize the effort required to bias said latch face relative to said latch surface.

2. A buckle assembly as set forth in claim 1 wherein said latch lever means comprises a transversely extending portion engageable with said latch plate and an upstanding portion engageable with said operator means, whereby downward movement of said operator means results in simultaneous upward movement of a portion of said latch lever and downward movement of a portion of said latch plate.

3. A buckle assembly as set forth in claim 1 wherein said resilient means normally exerts pressure against said latch lever means through said latch plate for maintaining said latch lever means engaged with said reentrantly folded edge portions of said base member.

4. A buckle assembly as set forth in claim 1 wherein one of said means acts to bias said latch plate in one direction relative to said tongue and another of said means acts to bias said tongue in the opposite direction relative to said latch plate means.

5. In a safety belt buckle assembly,
   a base member having a central web portion and a pair of laterally spaced side walls with reentrantly folded edge portions,
   a latch plate overlying said base member and having one end thereof movably engageable with said base member,
   said latch plate having means thereon defining a latch face,
   a belt tongue having means defining a latch surface engageable with said latch face on said plate for limiting relative movement between said tongue and said base member,
   resilient means normally biasing said latch plate toward said tongue,
   manual operator means,
   latch lever means having means thereon engageable with said latch plate, offset ear portions engageable with said folded edge portions, an upstanding portion engageable with said operator means, and a stripping portion engageable with said tongue,
   cover means overlying said base member and defining an access opening, and
   manual operator means disposed between said cover means and said belt tongue and accessible through said opening, movement of said operator means relative to said base member effecting movement of said latch lever means and said latch plate for disengaging said latch face of said plate from said latch surface of said tongue,
   said latch lever means extending transversely of said base member and being pivotable about an axis extending generally normal to said side walls, the laterally outer ends of said latch lever terminating in close proximity to said side walls of said base member and cooperating therewith in positioning said latch lever generally centrally of said base member.

6. A buckle assemply as set forth in claim 5 wherein said latch plate defines a recessed portion, and wherein said latch lever means is rotatably secured within said recessed portion, whereby movement of said operator means against said upstanding portion of said latch lever means effects preselected rotation thereof resulting in a downwardly directed force being applied to said latch plate by said ear portions of said latch lever, said force on said latch plate effecting disengagement of said latch face thereof from said latch surface on said tongue.

7. A buckle assembly as set forth in claim 5 wherein said stripping portion of said latch lever means is of a generally arcuate configuration and is movably engageable with said web portion of said base member.

8. A buckle assembly as set forth in claim 5 wherein said latch lever means provides a mechanical linkage between said operator means and said latch plate, and wherein said offset ear portions and said upstanding portion of said latch lever means are of different effective lengths, whereby to provide a mechanical advantage to minimize the effort required to bias said latch face relative to said latch surface.

9. A buckle assembly as set forth in claim 8 wherein the effective length of said upstanding portion of said latch lever means is at least slightly greater than the effective length of said offset ear portions.

10. In a safety belt buckle assembly,
a base member having a central web portion and a pair of laterally spaced upstanding side walls,
a latch member overlying said base member and pivotally supported thereby,
said latch member having means thereon defining a latch face,
a belt tongue having means defining a latch surface engageable with the latch face on said latch member for limiting relative movement between said tongue and said base member,
resilient means normally biasing said latch member toward locking engagement with said tongue,
a latch lever extending entirely across the web portion of said base member so as to be positioned by said side walls and having means thereon engageable with said latch member,
cover means overlying said base member and defining an access opening, and
manual operator means pivotally disposed between said cover means and said belt tongue and accessible through said opening, movement of said operator means relative to said base member effecting movement of said latch lever means relative to said latch member so as to permit disengagement of the latch face on said latch member from the latch surface of said tongue, said latch lever being pivotable about an axis extending parallel to the pivoted axis of said latch member,
said latch lever means providing a mechanical linkage between said operator means and said latch member and having a first portion supported on said base member for pivotal movement about an axis, a second portion engageable with said operator means, and a third portion engageable with said latch member, the effective length of said second portion from said axis being greater than the effective length of said third portion from said axis, whereby to provide a mechanical advantage to minimize the effort required to effect disengagement of said tongue from said latch member, 11. In a safety belt buckle assembly, a base member having a central web portion and a pair of laterally spaced upstanding side walls, a latch member overlying said base member and pivotally supported thereby, said latch member having means thereon defining a latch face, a belt tongue having means defining a latch surface engageable with the latch face on said latch member for limiting relative movement between said tongue and said base member, manual operator means, resilient means normally biasing said latch member toward locking engagement with said tongue, a pivotal latch lever extending entirely across the web portion of said base member so as to be positioned by said side walls and having means thereon engageable with said latch member and said manual operator means, cover means overlying said base member and defining an access opening, and said manual operator means pivotably disposed between said cover means and said belt tongue and accessible through said opening, movement of said operator means relative to said base member effecting movement of said latch lever means relative to said latch member so as to permit disengagement of the latch face on said latch member from the latch surface on said tongue, said latch lever being pivotable about an axis extending parallel to the pivotal axes of said latch member and said operator member, said latch lever means providing a mechanical linkage between said operator means and said latch member and providing a mechanical advantage to minimize the effort required to effect disengagement of said tongue from said latch member.

References Cited

UNITED STATES PATENTS

| 3,181,215 | 5/1965 | Eberhart. |
| 3,331,108 | 7/1967 | Fisher. |
| 3,364,531 | 1/1968 | Moss. |

FOREIGN PATENTS

| 818,988 | 8/1959 | Great Britain. |

BERNARD A. GELAK, Primary Examiner